Oct. 22, 1940.  E. E. HUEBOTTER  2,218,533
METHOD AND APPARATUS FOR FILTERING AND DEHYDRATING DRILLING MUD
Filed Feb. 6, 1939

INVENTOR
E. E. Huebotter
BY
ATTORNEYS.

Patented Oct. 22, 1940

2,218,533

UNITED STATES PATENT OFFICE 2,218,533

METHOD AND APPARATUS FOR FILTERING AND DEHYDRATING DRILLING MUD

Earl E. Huebotter, Tulsa, Okla., assignor to National Lead Company, a corporation of New Jersey Application February 6, 1939, Serial No. 254,751

16 Claims. (Cl. 255—24)

This invention relates to a method and apparatus for the treatment of fluids composed of solid matter in suspension in a liquid, and particularly to the treatment of well drilling fluids such as the muds employed in the drilling of wells.

In the drilling of oil, gas, sulfur or water wells, particularly by the rotary method, a hydraulic fluid ordinarily is forced by means of a pump down through the drill pipe, around the bit, up the annular space between the drill pipe and the wall of the well bore, and out at the surface of the ground, where the fluid passes through a series of ditches and settling pits, or other separating devices, back to the pump intake for recirculation through the well.

The hydraulic fluid serves several important functions in connection with the drilling operation. Its primary function is to pick up cuttings in the drilling zone and carry them from the well. Other more important functions are to cool and clean the drill bit; to lubricate the drill pipe; to prevent settling of cuttings when circulation of the fluid ceases to thereby prevent sticking of the drill pipe and tools; to exert a hydrostatic pressure against the subterranean strata traversed by the well bore to thereby check inflows of high pressure oil, gas or water which may be encountered; and to seal the strata forming the wall of the well bore to prevent loss of drilling fluid into the strata and to prevent caving of loose, unconsolidated matter from the strata into the well bore.

Drilling fluids having these desired properties ordinarily consist of fresh water, which serves as a vehicle; finely divided, non-colloidal clays, barium sulfate, iron oxide, and similar materials, preferably of a relatively high specific gravity in order to impart greater hydrostatic pressure characteristics to the fluid; and finely divided colloidal matter such as bentonite and similar colloidal clays, which serve to maintain the non-colloidal matter in more or less permanent suspension in the water and which impart the desired viscosity, gelling and wall sealing properties to the drilling fluid.

Such fluids, by their very nature, are relatively unstable, and maintenance of their stability is greatly complicated in practice by contamination of the fluid with various solid and liquid substances present in the earth strata, and which are drilled out by the action of the drill bit and mix with the hydraulic fluid. One of the worst offenders, in this respect, is salt water, which is very often encountered in the course of drilling, and which, if allowed to remain in the drilling fluid for a period of more than a few hours, destroys the stability of the suspension and causes flocculation of the solid phase with attendant sharp increases in viscosity such that the fluid becomes too thick to pump, its wall building properties are destroyed, and its ability to drop out drill cuttings is materially depreciated. Furthermore, once a drilling fluid has been flocculated by salt water, it cannot easily be restored to its original condition by chemical treatment, and generally, must be completely discarded from the system and replaced by fresh fluid, thereby greatly increasing the expense of the drilling operation.

Similar difficulties result when dry salt beds are pierced by the drill bit, for such salt will dissolve in the aqueous phase of the drilling fluid and will have the same undesirable effects thereon as are produced by salt water.

Even fresh water, if encountered in excessive quantities, produces deleterious effects in the drilling fluid by the resulting dilution thereof. The principal effect is a reduction in the viscosity of the drilling fluid, which reduces the capacity thereof to pick up drill cuttings and carry them from the drilling zone to the surface of the ground. This condition may be corrected by the addition of more solid phase to the fluid, but, of course, this has the disadvantages of increasing the cost of the drilling operation and increasing the total volume of fluid in the system, which, at times, is quite undesirable.

Again, some of the drill cuttings, particularly those which become finely ground by the action of the drill bit, and those which are strongly alkaline in nature and soluble in water, will mix with the drilling fluid and cause substantial increases in its optimum viscosity. This results in pumping difficulties and reduces the ability of the drilling fluid to drop out sand and other cuttings and to release entrained gas. Under such conditions, it has heretofore been necessary to greatly dilute the fluid with fresh water to enable it to drop the cuttings and release the gas, but then the specific gravity of the fluid becomes correspondingly lower than its original specific gravity, once the cuttings have been removed, and additional weighting material must be added to return the fluid to proper condition.

Since most of these difficulties may be ascribed to contamination of the liquid phase, it has been found that such difficulties can be satisfactorily overcome, in many cases, by treating the contaminated fluid by a novel filtration method to thereby separate the liquid and solid phases from each other, and to then replace the contaminated liquid phase by fresh water in an amount sufficient, when remixed with the solid phase, to restore the fluid to substantially its original condition. Where the fluid has become excessively dilute by the addition thereto of fresh water in the well, the excess water can be removed from the fluid by this method and discarded. Where the fluid has become excessively viscous, as by contamination with solid matter, it may be diluted with fresh liquid to the point where the cuttings and gas may be readily released therefrom, and the excess fluid then removed by the new method and the fluid restored to its original condition.

The novel method of filtration contemplated by this invention, is a continuous method whereby, instead of flowing fluid to be filtered directly against the filter media, as is done in conventional filter practice, until a cake of solid matter has been built up on the filter media of such thickness as to halt further filtering action, the fluid, in accordance with this invention, is passed at high velocity and under pressure between closely spaced filter media. The pressure applied is ordinarily controlled so as to force the liquid phase of the fluid through the filter media at a controlled rate, while the velocity is maintained at such a rate as to continuously remove, by erosive action, from the filter media surfaces the filter cake formed thereon by the deposit of the solid phase and to thus continously keep the filter media open. The rate of removal of liquid phase from the fluid is generally so controlled that the remaining fluid will retain sufficient fluidity to be readily pumpable, in order that proper erosive velocity may be maintained and the passages between the filter media kept open. By this method, any desired proportion of the liquid phase may be removed from the fluid by continuous filtration and various modifications may be employed, particularly in the treatment of well drilling fluids, whereby the several disadvantageous conditions encountered in drilling of wells, as outlined above, may be corrected, as will be described in greater detail hereinafter.

Therefore, it is a principal object of this invention to provide a method for treating fluids consisting of a suspension of solid matter in a liquid phase by continuous filtration thereof.

Another object is to provide a method of removing excess or undesirable liquid phase from the fluids of the class described.

A further object is to provide a method of altering the relative proportions of liquid to solid phase of fluids of the class described.

A more specific object is to provide a method for the treatment of well drilling fluids by the continuous filtration thereof.

An additional specific object is to provide a method for separating excess and undesirable liquid phase from the solid phase of well drilling fluids by the continuous filtration thereof.

Still another object is to provide a form of apparatus suitable for conducting the methods of this invention in successfully accomplishing the aforementioned objects.

Other objects and advantages of this invention will become apparent from the following detailed description taken in conjunction with the accompanying drawing which illustrates, more or less diagrammatically, a form of apparatus suitable for practicing the invention.

Figures 1, 2:
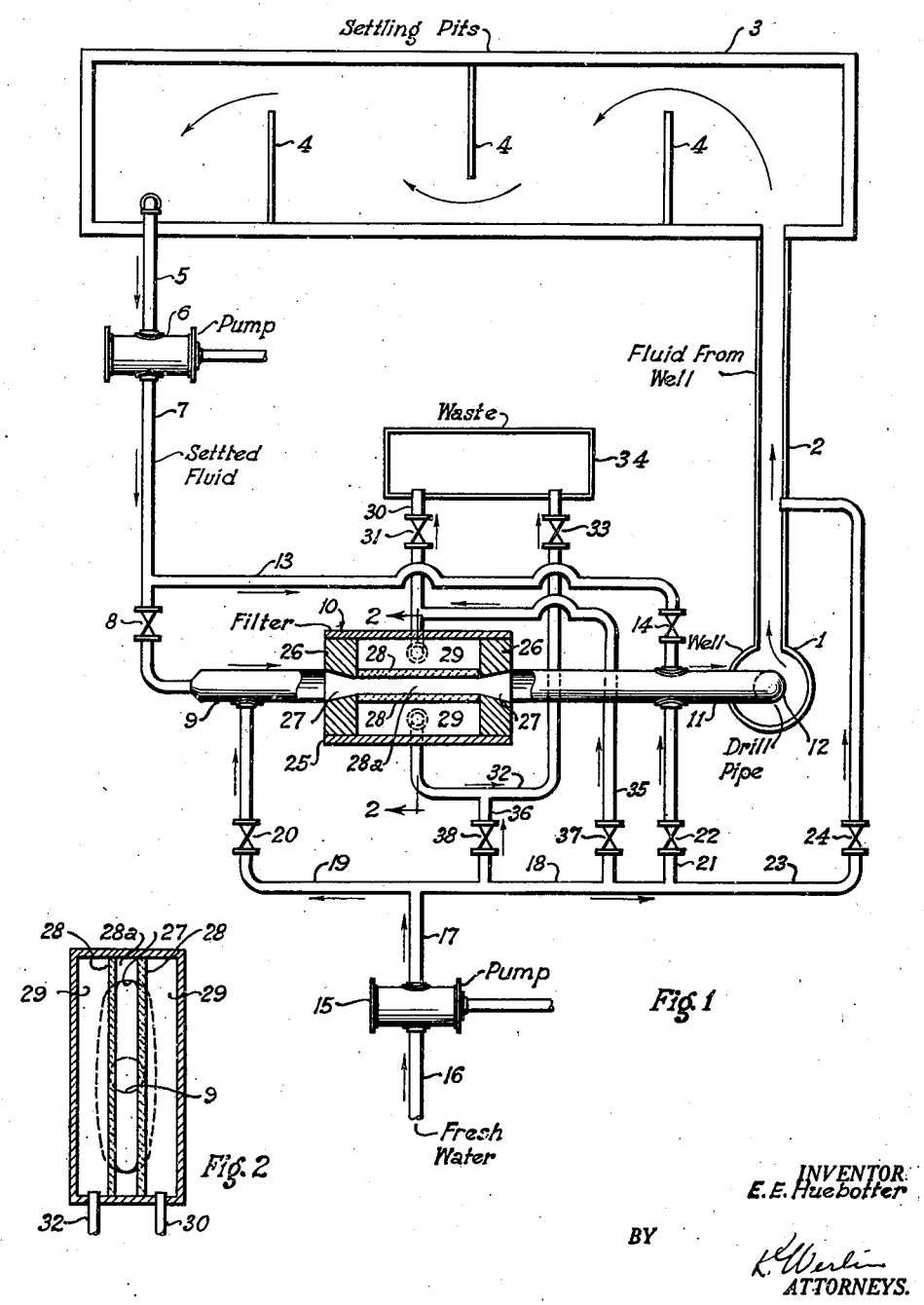
Fig. 1 is a flow plan of apparatus for practicing the invention in treating well drilling fluids, and showing in horizontal section the filtration apparatus to be employed.
Fig. 2 is a cross section of the filtration apparatus taken along line 2—2 of Fig. 1.

Referring to the drawing, the numeral 1 represents a well being drilled by conventional rotary methods and through which a hydraulic fluid is circulated. A conduit 2 leads from well 1 to one end of a series of gravity settling pits 3 provided with baffles 4, where well cuttings are separated from the hydraulic fluid and entrained gas released therefrom. Instead of gravity settling pits 3, mechanical shakers, screens, separators, or similar devices well known in the art, may be used to separate cuttings and gas from the hydraulic fluid. From the opposite end of settling pits 3, a suction pipe 5 leads to a pressure pump 6, having a discharge pipe 7, in which is mounted a valve 8, and which connects to an inlet nozzle 9, which is, in turn, connected to the inlet of a filter, designated generally by the numeral 10 to be described in greater detail hereinafter. From the outlet of filter 10 a pipe 11 leads to the inlet of the conventional hollow drill pipe 12, which extend downwardly in well 1 to the bottom thereof and is provided at its lower end with a conventional drill bit, not shown, having the conventional openings or "eyes" which provide discharge ports from the interior of the drill pipe 12 to the annular space between the drill pipe and the wall of well 1. A by-pass pipe 13, fitted with a valve 14, leads from a point in pipe 7 between pump 6 and valve 8 around filter 10 and connects into pipe 11 between the filter and drill pipe 12. A pump 15 is connected by a pipe 16 to a source of supply of fresh water, not shown, and has a discharge pipe 17, which connects into a header 18, from which a branch pipe 21, having a valve 22, leads into pipe 11, a branch pipe 19, having a valve 20 leads into nozzle 9, and a branch pipe 23, having a valve 24, leads into conduit 2 between well 1 and settling pits 3.

Filter 10 consists of a housing 25, preferably constructed of metal of sufficient strength to withstand internal pressures of the order of 200 to 1000 lbs. per sq. in. or more, and provided with end members 26—26, preferably provided with narrow, elongated openings 27—27, whose horizontal diameters are substantially less than their vertical diameters, thus providing narrow orifices which converge inwardly toward each other, and have parallel sides. One of the openings 27 is connected to nozzle 9 and the other to the end of pipe 11 which connects to filter 10. A pair of filter plates 28—28, arranged in parallel and narrowly spaced apart to form a passageway 28a therebetween, are positioned vertically within housing 25 and extend across the length of the filter between the end pieces 26—26. The adjacent inner faces of filter plates 28—28 register at each end with the corresponding side edges of the corresponding opening 27. The top, bottom and end edges of filter plates 28 are closely fitted within housing 25 and end pieces 26 so as to form fluid tight connection therewith even under high pressures. Reinforcing sealing means of any known design may, of course, be employed to assure a proper seal at these points. The outer faces of filter plates 28—28 are spaced from the adjacent side walls of housing 25 forming a pair of chambers 29—29 for receiving filtrate passing through the filter plates. The top, bottom and outer side walls of chambers 29 are formed by the housing 25, the inner side walls by the filter plates 28 and the end walls by the end pieces 26. A pipe 30, having a valve 31, communicates with one of the chambers 29 through the bottom thereof, and a pipe 32, having a valve 33, communicates similarly with the other one of chambers 29. Pipes 30 and 32 discharge into a waste pit 34. Branch pipe 35 and 36, fitted, respectively, with valves 37 and 38, lead from header 18 and connect to pipes 30 and 32, respectively.

The area of passageway 28a may be varied depending upon the viscosity of the fluid to be filtered, the pressures employed, and the volume of fluid to be treated, but in every case, is such as to provide high velocity of flow of the fluid across the faces of the filter plates forming the sides of passageway 28a.

The filter plates 28 may be constructed of any suitable filter media which will permit of a satisfactory rate of filtration of the particular fluid to be treated, and which will be resistant to the erosive action of the fluid. Such filter media as porous alundum, carborundum, carbon, woven fabrics, metal screen and the like may be used depending upon the conditions encountered in practice.

The filter plates may be, and usually are, constructed with stiffening and reinforcing framing and attachment members to enable them to withstand any pressures which may be employed. Also, a plurality of filter cells may be used and arranged in series or in parallel to provide sufficient filter surface to meet varying operating conditions. Similarly, various modifications and alterations may be made in the shape, size and arrangement of parts of the apparatus to meet different conditions which may be encountered in practice.

The described apparatus is employed in the following manner in practicing the method steps of this invention when applied particularly to the treatment of well drilling fluids.

As noted above, hydraulic fluid is pumped into well 1 through the interior of drill pipe 12 to the bottom of the well where it is discharged through the drill bit openings and picks up the well cuttings removed by the bit and carries them through the annular space between the drill pipe and the wall of the well bore to the surface of the ground, where the cuttings, laden fluid is discharged through conduit 2 into pits 3.

Also as previously noted, hydraulic fluids commonly employed in rotary drilling comprise suspensions of finely divided clays in water, and in some cases, include relatively high specific gravity weighting materials. When freshly prepared, and in the absence of certain contaminating substances which may be encountered in the well, such suspensions are fairly permanent, and are able to drop out the cuttings and release any entrained gas quite satisfactorily when allowed to flow through the settling pits 3, without affecting any material change in the relative proportions of liquid to solid phase of the original fluid. However, when the drill bit encounters, for example, a sub-surface formation containing salt, either dry or as salt water, these materials dissolve in the fluid, and if allowed to remain there for a period of more than a few hours, destroy the stability of the suspension with the deleterious results previously described. If it is assumed, therefore, that salt has been encountered in the well by the drilling fluid, as will frequently happen in practice, it may be removed by the process of this invention as follows: The drilling fluid, freed of cuttings and gas in settling pits 3, but still contaminated by the salt, which is, of course, dissolved in the liquid phase of the fluid, is drawn from the pits 3 through pipe 5 by pump 6 and pumped at high pressure through pipe 7, then through filter 10, where it passes at high velocity through passageway 28a between filter plates 28—28, and thence through pipe 11 back to drill pipe 12. Under the pressure applied to the fluid passing through the filter, the liquid phase thereof will be forced through the porous filter plates 28 into chambers 29—29, whence the filtrate will be discharged to waste pits 34 through pipes 30 and 32. At the same time, of course, solid phase of the fluid, under the applied pressure, will deposit on the inner faces of the filter plates. However, by proper spacing of the filter plates in accordance with the volume of fluid passing through the filter and the pressure applied, a sufficiently high velocity rate is maintained in the stream of fluid to continuously flush the deposited solid phase from the filter plates by the erosive action of the stream. In this way, the filter plates are kept open and the solid phase retained in the fluid. Since, however, it is generally undesirable to remove too much of the liquid phase as this would result in undue increase in viscosity of the fluid and would increase pumping difficulties as well as reduce the velocity through the filter, it is generally preferable to maintain a controlled differential pressure across the filter plates between passageway 28a and chambers 29, in order to control the filtration rate to that desired. Since the pressure on the fluid must generally remain constant, as this is governed largely by the pressure required for circulating the fluid through the well, the differential pressure is controlled by controlling the pressure in chambers 29—29. This is accomplished by holding back-pressure on the chambers by suitable manipulation of valves 31 and 33. By thus controlling the differential pressure, as much contaminated liquid phase as desired may be separated from the fluid and removed from the system. In this way, enough liquid phase is removed, generally, to decrease the relative proportion of liquid phase to solid phase below that of the original fluid. As pointed out, however, it is undesirable to remove all or too great a proportion of the liquid phase. The fluid now emerging from filter 10 will, therefore, be deficient in liquid phase. To restore the fluid to its original composition, fresh water is injected into the fluid passing through pipe 11 by opening valve 22 in branch pipe 21 and forcing water therethrough from header 18 by means of pump 15. The amount of fresh water thus added, ordinarily, will be only sufficient to restore the fluid to its original liquid-solid composition. Since, however, not all of the contaminated liquid phase was removed in the filtration step, some salt will remain in the fluid, but its percentage will be reduced in an amount proportional to the amount of contaminated liquid phase removed from the fluid in the filter. It is found unnecessary to remove all of the salt in one filtering operation, as the rate of circulation of the drilling fluid is ordinarily sufficiently great, that by removing a small amount of salt upon each passage of the fluid through its cycle, the total quantity of salt in the fluid will be progressively reduced until, in a comparatively short time, it will have been reduced to an amount which can be tolerated in the drilling fluid without damage to the fluid.

Where relatively large quantities of salt water are encountered in the drilling, so that the drilling fluid is greatly diluted thereby, it is only necessary to increase the filtration rate in filter 10 to take out the excess liquid phase plus an additional amount, equivalent in volume to a portion of the original liquid phase, and to replace the latter only with fresh water. Thus the concentration of salt in the drilling fluid is progressively reduced in the same manner as above described.

Where the fluid becomes diluted by fresh water, it is only necessary to filter out the excess water, no replacement being necessary in such a case to restore the fluid to its original composition.

Where the drilling fluid has become contaminated by salt, or other soluble impurities, unaccompanied by excessive dilution, fresh water may be added through pipe 19 and valve 20 to the fluid entering the filter 10 through nozzle 9 to permit of a higher filtration rate and to provide a species of washing action upon the solid phase. The added excess liquid can then be removed in the filter and the concentration of the soluble impurities thus decreased progressively to a tolerable proportion, as described above.

Where the fluid has become contaminated by solid substances or alkaline materials which cause sharp increases in its viscosity and decrease its ability to satisfactorily release cuttings and gas in pits 3, such fluid, as it leaves well 1, may be diluted in conduit 2 by the addition of suitable quantities of fresh water supplied from pipe 23 in an amount sufficient to reduce the viscosity of the fluid to the point where cuttings and gas may be readily released in pits 3. The diluted fluid then passes through filter 10 where the excess liquid phase is removed by filtration, as above described.

In the course of filtration, particularly when filter media of substantial thickness are used, such as porous alundun, carborundum, or carbon plates, some of the very finest particles of the solid phase of the fluid may collect in the pores of the media below the faces thereof which are subjected to the erosive action of the high velocity stream of fluid, and may eventually plug the pores in the plates or decrease the filtration rate below that which may be desirable. In such cases, the filter media may be regenerated by by-passing the fluid around filter 10 through pipe 13, and pumping water under pressure through pipes 35 and 36 into chambers 29—29 and "washing back" the filter media into passageway 28a until the pores are cleaned. This operation may be repeated at intervals, regular or otherwise, as may be required or found desirable.

Since, in some cases, only a portion of the excessive or undesirable liquid phase need be removed from the fluid on each cycle thereof, as pointed out above, this may be accomplished by passing only a portion of the circulating fluid through filter 10, the balance being by-passed around the filter through by-pass pipe 13 by proper adjustment of valves 8 and 14. This will permit reduction in the size of the filter plate area required in many cases and also may permit a higher relative filtration rate of that portion being filtered, to produce the desired alteration in the composition of the fluid in about the same period of time as when all of the fluid is passed through the filter.

While this invention is described in detail above, as applied particularly to the treatment of well drilling fluids, it will be understood that the novel method and apparatus may be applied with equal success and advantageous results to the treatment of other fluids which comprise a suspension of a solid phase in a liquid phase, whether the fluid is an aqueous fluid, or some other liquid of non-aqueous nature.

Numerous modifications and alterations may be made in the process steps and in the details of the apparatus herein described without departing from the scope of the appended claims.

What we claim and desire to secure by Letters Patent is:

1. In the treatment of fluids consisting of a suspension of solid matter in a liquid, wherein said fluid has become contaminated by an undesirable substance dissolved in said liquid, the method of decreasing the concentration of said undesirable substance in said fluid which comprises, flowing said fluid in a restricted stream through a filtration zone wherein said stream is confined between porous filter media, applying sufficient pressure to said stream in said zone to force contaminated liquid phase through said filter media and out of said fluid, maintaining sufficient velocity in said stream to continuously remove from the adjacent faces of said filter media by erosive action of said stream the solids depositing thereon to thereby retain said solids in said fluid, and thereafter adding uncontaminated liquid to said stream of fluid to replace said contaminated liquid removed therefrom in said filtration zone.

2. A method according to claim 1 wherein said fluid comprises a well drilling fluid consisting of a suspension of clay solids in water, and wherein said undesirable substance comprises a material of the class salt, salt water.

3. A method according to claim 1 wherein a controlled differential pressure is maintained across said filter media to thereby control the rate of removal of said liquid phase from said fluid.

4. In the treatment of fluids consisting of a suspension of solid matter in a liquid wherein said fluid has become contaminated with an undesirable substance dissolved in said fluid, the method of decreasing the concentration of said undesirable substance in said fluid which comprises, diluting said fluid with uncontaminated liquid, flowing the diluted fluid in a restricted stream through a filtration zone wherein said stream is confined between porous filter media, applying sufficient pressure to said stream in said zone to force through said filter media and out of said fluid an amount of contaminated liquid phase in excess of the amount of liquid previously added, maintaining sufficient velocity in said stream to continuously remove from the adjacent faces of said filter media by the erosive action of said stream the solids depositing thereon to thereby retain said solids in said fluid, and thereafter adding uncontaminated liquid to said stream of fluid in an amount sufficient to replace said excess.

5. In the drilling of wells wherein a drilling fluid comprising a suspension of solid matter in liquid is circulated through the drilling zone of a well wherein the proportion of liquid in said fluid is increased by the addition thereto of foreign liquid encountered in said well, the method of restoring said fluid to its original solid-liquid proportions which comprises, flowing said fluid leaving the well through a filtration zone in a restricted stream confined between porous filter media, applying sufficient pressure to said stream in said filtration zone to force through said filter media and out of said fluid an amount of said liquid substantially equal to said increased proportion, and maintaining sufficient velocity in said stream to continuously remove from the adjacent faces of said filter media by erosive action of said stream the solids depositing thereon to thereby retain said solids in said fluid.

6. In the drilling of wells wherein a drilling fluid comprising a suspension of solid matter in a liquid is circulated through the drilling zone of a well wherein the proportion of solid matter in said fluid is increased by the addition thereto of solid cuttings from the well, the method of restoring said fluid to substantially its original condition which comprises, diluting the fluid leaving the well with an amount of liquid sufficient to cause said fluid to rapidly separate from said solid cuttings in a subsequent separation zone, therein separating said solid cuttings from the diluted fluid, then passing said diluted fluid in a restricted stream through a filtration zone wherein said stream is confined between porous filter media, applying sufficient pressure to said stream in said filtration zone to force through said filter media and out of said fluid an amount of said liquid substantially equal to that previously added, and maintaining sufficient velocity in said stream to continuously remove from the adjacent faces of said filter media by erosive action of said stream the solids depositing thereon to thereby retain said solids in said fluid.

7. In the drilling of wells wherein a stream of drilling fluid comprising a suspension of solid matter in a liquid is circulated in a closed cycle through a well wherein said fluid is contaminated by added solid cuttings and by added liquids, the method of restoring said fluid to substantially its original condition, which comprises, separating said solid cuttings from said fluid at one point in said cycle, thereafter separating from said fluid by filtration at another point in said cycle an amount of liquid phase substantially equal to said added liquids, said filtration being accomplished by passing said fluid at relatively high velocity and under pressure across a porous filter medium, and then returning the thus restored fluid to said well to thereby complete said cycle.

8. In the drilling of wells wherein a stream of drilling fluid comprising a suspension of solid matter in a liquid is circulated in a closed cycle through a well wherein said fluid is contaminated by added solid cuttings and by added liquids, the method of restoring said fluid to substantially its original condition which comprises, separating solid cuttings from said fluid by gravity separation at one point in said cycle, passing a restricted stream of said fluid freed of said cuttings at another point in said cycle through a filtration zone wherein said stream is confined between porous filter media, applying sufficient pressure to said stream in said filtration zone to force through said filter media and out of said fluid an amount of liquid substantially equal to that added thereto in said well, maintaining sufficient velocity in said stream to continuously remove from the adjacent faces of said filter media by erosive action of said stream the solids depositing thereon to thereby retain said solids in said fluid, and thereafter returning said fluid to said well to thereby complete said cycle.

9. In the treatment of well drilling mud having a proportion of liquid phase to solid phase in excess of that desired, the method of restoring said mud to the desired liquid-solid proportion which comprises, passing said mud across a porous filter medium under pressure sufficient to force excess liquid phase through said filter medium and out of said mud, and at sufficient velocity to prevent substantial deposition of said solid phase on said filter medium to thereby retain said solid phase in said mud.

10. In the treatment of well drilling mud having a proportion of liquid phase to solid phase in excess of that desired, the method of restoring said mud to the desired liquid-solid proportions which comprises, passing said mud across a porous filter medium under pressure sufficient to force excess liquid phase through said filter medium and out of said mud and at sufficient velocity to prevent substantial deposition of said solid phase on said filter medium to thereby retain said solid phase in said mud, and maintaining a controlled differential pressure across said filter medium to thereby control the rate of removal of said liquid phase from said mud.

11. In the treatment of well drilling mud having a proportion of liquid phase to solid phase in excess of that desired, the method of restoring said mud to the desired liquid-solid proportions which comprises, passing a portion of said mud across a porous filter medium under pressure sufficient to force excess liquid phase through said filter medium and out of said mud and at sufficient velocity to prevent substantial deposition of said solid phase on said filter medium to thereby retain said solid phase in said mud, by-passing the remainder of said mud around said filter medium, and re-mixing said remainder with said portion after the latter has passed across said filter medium.

12. In the treatment of well drilling mud which has become contaminated by an undesirable substance dissolved in the liquid phase of said mud, the method of decreasing the concentration of said undesirable substance in said mud which comprises, passing said mud across a porous filter medium at sufficient pressure to force contaminated liquid phase through said filter medium and out of said mud and at sufficient velocity to prevent substantial deposition of the solid phase of said mud on said filter medium to thereby retain said solid phase in said mud, and thereafter adding uncontaminated liquid to said mud to replace said contaminated liquid phase previously removed from said mud.

13. Apparatus for treating well muds comprising in combination with a well, a conduit for introducing drilling mud into said well, means for adding liquid phase to said mud in said conduit, filter means arranged in said conduit for filtering the drilling mud and added liquid phase flowing to said well, said filter means including a restricted passageway formed of a porous filter medium, means for forcing said drilling mud and added liquid phase through said conduit and through said passageway under pressure and at relatively high velocity, and means associated with said filter medium to control the proportion of liquid phase removed therethrough from said mud to an amount substantially equal to that previously added.

14. Apparatus for treating well drilling muds comprising in combination with a well and a closed circuit leading to and from said well for circulation of said drilling mud therethrough, means for continuously extracting a controlled portion of the liquid phase of said mud while retaining substantially all the solid phase in said mud, said means including a porous filter medium positioned in said circuit and forming a restricted passageway through which said mud passes, means for forcing said mud through said passageway at relatively high pressure and at relatively high velocity, means for receiving filtrate discharged through said filter medium, and control means associated with the filtrate receiving means for maintaining a controlled pressure differential across said filter medium to thereby control the proportion of liquid phase filtered from said mud.

15. Apparatus for treating well drilling mud comprising in combination with a well and a closed circuit leading to and from said well for circulation of said drilling mud therethrough, a conduit forming a portion of said circuit, filter means positioned in said conduit, said filter means including spaced porous filter media arranged to form a restricted passageway therethrough, chamber means arranged to receive filtrate passing through said filter media, a valved conduit in communication wth said chamber means, and means for forcing said drilling fluid under relatively high pressure and at high velocity through said restricted passageway.

16. Apparatus for treating well drilling muds comprising in combination with a well and a closed circuit leading to and from said well for circulation of said drilling mud therethrough, filter means positioned in said circut including a housing, a restricted passageway extending through said housing, said passageway being formed by a porous filter medium, a filtrate receiving chamber in said housing adapted to receive filtrate passing through said filter medium, an inlet conduit communicating with one end of said passageway, an outlet conduit communicating with the opposite end of said passageway, means for supplying said mud under pressure and at high velocity to said inlet conduit for transmission through said passageway and across said filter medium, a filtrate discharge pipe leading from said filtrate receiving chamber, means in said pipe for holding controlled back pressure in said chambers, and a valved by-pass conduit extending between said inlet and outlet conduits and around said filter means.

EARL E. HUEBOTTER.